Jan. 9, 1934.  S. P. MILLER  1,942,764
PROCESS AND APPARATUS FOR COOLING AND GRANULATING RESIN
Filed Feb. 28, 1929  2 Sheets-Sheet 2
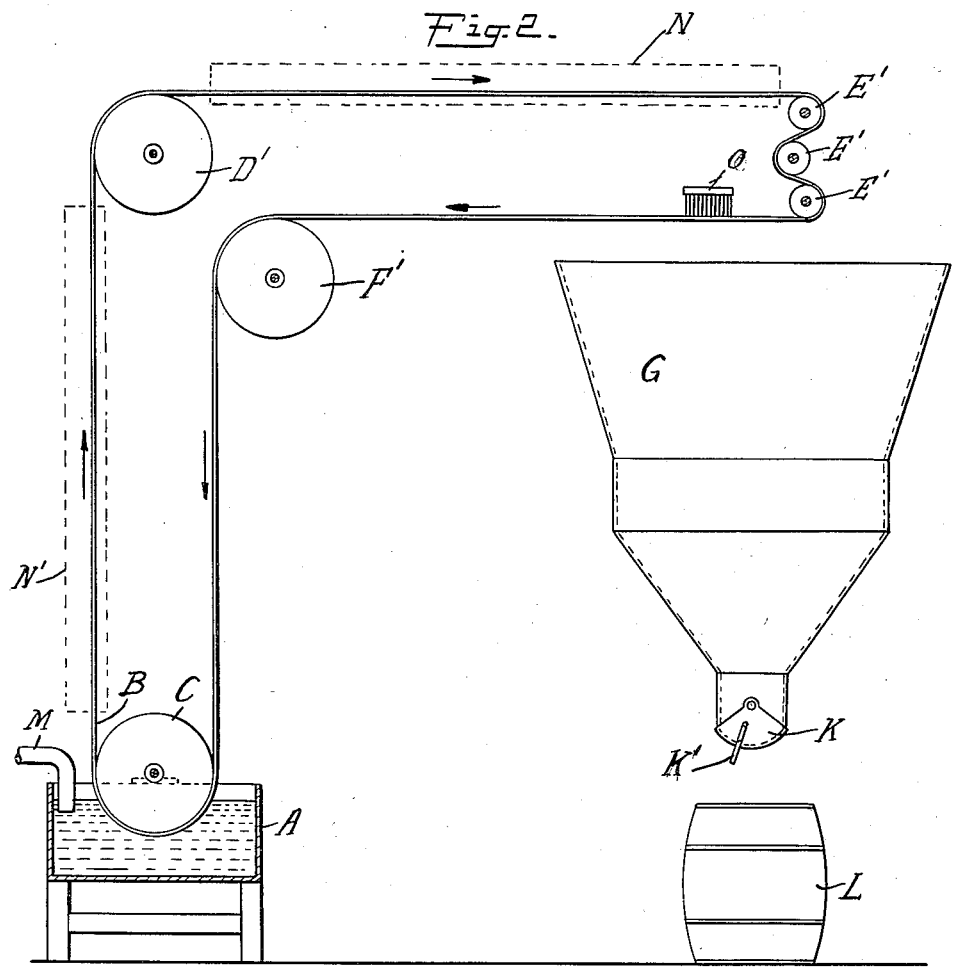
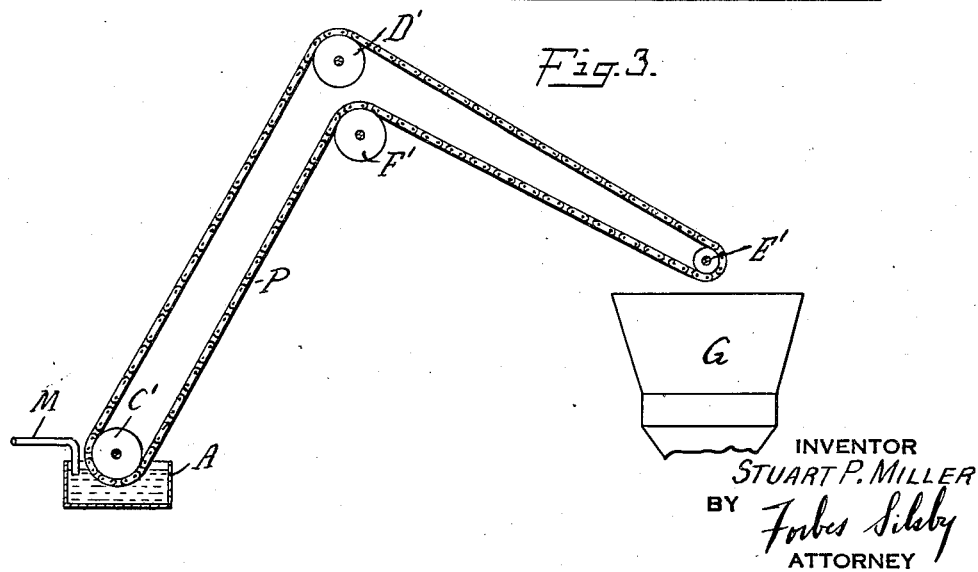
INVENTOR
STUART P. MILLER
BY Forbes Silsby
ATTORNEY Patented Jan. 9, 1934

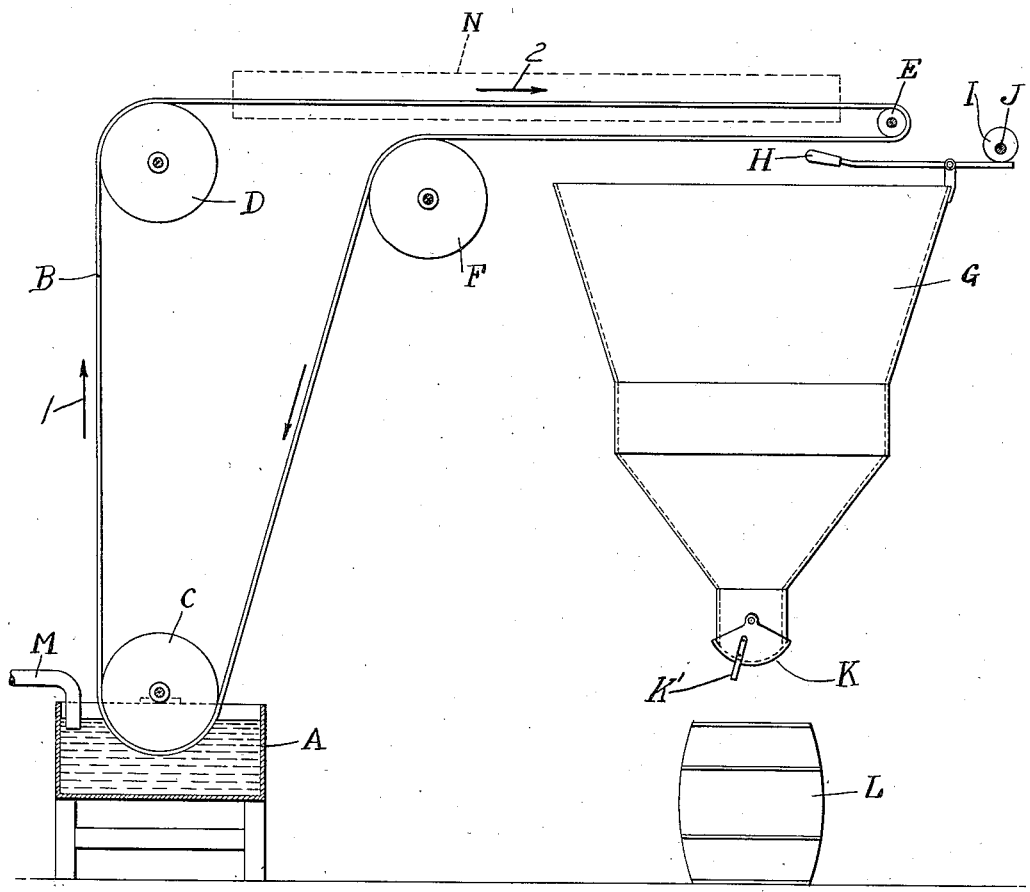

1,942,764

UNITED STATES PATENT OFFICE

1,942,764

PROCESS AND APPARATUS FOR COOLING AND GRANULATING RESIN

Stuart P. Miller, Englewood, N. J., assignor to The Barrett Company, New York, N. Y., a corporation of New Jersey Application February 28, 1929. Serial No. 343,525

10 Claims. (Cl. 83—91)

My invention relates to a process and apparatus for cooling and granulating resinous materials of the type that are solid at normal room temperatures but which are liquid at higher temperatures. My invention is particularly useful in the manufacture of synthetic resins of the paracoumarone or "cumar" type which it is equally applicable to other resins.

In the final stage of the manufacture of paracoumarone resin, this material is separated from attendant volatile impurities by distillation, and the resin remaining in the still is in a liquefied condition at a relatively high temperature—is about 150–200° C. The proper cooling and granulation of this material has been a troublesome problem in the past. In accordance with my invention, previous difficulties in the cooling and granulation of resins such as paracoumarone are avoided and a process and apparatus are provided whereby the paracoumarone resin is rapidly and continuously transformed from liquid condition to granular solid form without the delay attendant on cooling in large masses and without the production of large blocks of solid material or the use of grinding or pulverizing processes.

My invention may best be understood by reference to the accompanying drawings in which Fig. 1 somewhat diagrammatically illustrates suitable apparatus, partly in side elevation and partly in cross section, for practicing my invention:

Fig. 2 digrammatically shows a modified apparatus, partly in cross section and partly in elevation, in which agitating mechanism for the belt are not utilized, and Fig. 3 diagrammatically shows still another modification in which chains are used in lieu of the belts of Figs. 1 and 2.

In Fig. 1 of the drawings, (A) is a tank containing molten resin and (B) is an endless foraminous belt or wire screen. The belt (B) passing around pulleys (C), (D), (E), and (F), preferably has two runs, one positioned in a vertical plane as indicated by the arrow 1, and the other positioned in a horizontal plane as indicated by the arrow 2, and is caused to travel in the direction shown by the arrows in Fig. 1 by the rotation of one or more of the pulleys by any convenient mechanical means.

As the foraminous belt travels around pulley (C), it is immersed in and coated with the molten resin, and as it rises upward from pulley (C) it carries the coating of molten resin with it. During the travel of the belt between pulleys (C) and (E), the coating of resin gradually solidifies. This solidification takes place fairly rapidly on account of the relative thinness of the film of resin that is exposed to the cooling action of the air. In practice, the process is operated in such a manner that the resin on the belt has solidified before it reaches the pulley (E). This may be accomplished by controlling the speed of the belt, and if a more rapid cooling is desired, a current of air may be blown against the resin-coated belt during its travel from pulley (C) to pulley (E), or the belt may be passed through a suitable refrigerating chamber indicated in phantom at (N) on the drawings.

Pulley (E) is preferably of a small diameter so that the belt may be sharply bent during its travel around it. The bending of the belt, as it passes around pulley (E), results in the fracture of the film of solidified resin previously adherent to it, the film breaking up into fragments or granules. As the belt completes its travel around pulley (E) these fragments or granules fall into hopper (G). As the belt returns to pulley (F), it preferably is caused to vibrate by means of the knocker arm (H) which is shown in the drawings as operated by cam (I) on rotating shaft (J). The vibration of the belt induced by the rapid vibratory impact of knocker (H) causes any remaining fragments of resin to be loosened from the belt and to be discharged into hopper (G).

The belt (B), thus freed of resin, continues its travel, passing around pulley (F) and returning to tank (A). The hopper (G) is equipped with a discharge port door or gate (K) through which the resin may be discharged to a suitable container such as (L). The gate (K) is provided with a handle or lever (K') to permit ready manipulation of the gate. The tank (A) may be supplied with molten resin from any available source through supply pipe (M).

Numerous improvements may be made in the apparatus and process thus illustrated without departing from the spirit of my invention. The tank (A) may be insulated to prevent premature cooling of the resin and heat-adjusting means may be introduced to preserve any desired uniform temperature. The knocker (H) may be dispensed with, if desired, or, in place of the knocker (H) any other suitable means for vibrating the belt may be employed and scrapers may be used to insure the removal of all of the resin from the belt.

The modified apparatus of Fig. 2 is designed to eliminate use of the knocker arms (H). The bet (B) passes from pulley (D) over staggered pulleys (E'), so that due to the bends imparted to the belt in passing over the pulleys (E'), the film of resin is fractured and falls into hopper (G). A scraper or stiff brush (O) is preferably, positioned with the scraping surface or bristles arranged diagonally to the lower run of the belt (B) above the hopper (G). This brush functions to remove loose chips or fragments of solidified resin from the belt and to cause them to drop into the hopper (G).

A refrigerating chamber (N') indicated in phantom, is positioned so that the run of the belt (B) immediately after leaving tank (A) passes therethrough. The degree of refrigeration as above pointed out, is regulated to deliver cold material from pulleys (E'). By using refrigerating chambers on both the vertical and horizontal runs of the belt (B), the capacity thereof may be substantially increased.

In the modification shown in Fig. 3, a plurality of chains (P), preferably arranged in parallel relation disposed over sprockets or pulleys (C'), (D'), (E'), and (F'), are utilized in lieu of the foraminous belt B of Figs. 1 and 2. The chains are shown as traveling in inclined planes as compared with the vertical and horizontal runs of the belt (B). It will be understood, of course, that the belt (B) could be arranged to also travel in a sloping or other direction as indicated in Fig. 3 as distinguished from its travel in vertical and horizontal planes as shown in Figs. 1 and 2.

The use of a foraminous belt, i. e., a belt with holes in it or a screen belt or chains, causes the resin to adhere to the meshes or openings in the belt until the resin hardens and the belt breaks over the pulley (E) or (E') as the case may be. The cooled resin falls from the belt in the form of chips of substantially uniform size and shape, and thus a substantially uniform product is obtained.

In using my apparatus and process for the cooling and granulation of cumar resin, I prefer to maintain the molten resin in tank (A) at a temperature of 165-200° C., and to cool the solidified resin to a temperature beow 75° C., preferably to approximately room temperature, before removing it from the belt. The following figures, which are derived from practice, illustrate the results obtained by my invention when applied to the cooling and granulation of cumar resin. The molten cumar is maintained at a temperature of 165-200° C., and a belt three feet wide is passed through it at a linear velocity of about twenty feet per minute. This belt is a wire screen having a mesh of ½"x¼" and is of the type known as "spiral drainage wire" such as is manufactured by Procter and Schwartz of Philadelphia. Under the conditions described, the belt carries about .815 pound of cumar per square foot and about 3000 pounds of resin may thus be cooled and granulated in each hour of operation. The granulated cumar thus produced does not contain any fragments of a size substantially exceeding ¼" in diameter. A typical screen analysis of the material produced in this manner shows the following result:

| Percent of material passing screens | Screen meshes per square inch |
|---|---|
| 2 | 100 |
| 5 | 80 |
| 8.5 | 60 |
| 15.5 | 40 |
| 41.5 | 20 |
| 82 | 10 |

By the term "foraminous belt" as used in the claims herein, it is intended to include a wire or other screen belt or a belt with holes or chains.

I claim:

1. A process which comprises forming a film of resin in molten condition, said film having projections substantially uniformly distributed thereon, cooling the film to cause the resin to solidify, and granulating the resultant solidified resin.

2. A process which comprises forming molten resin at a temperature of about 165° C. to about 200° C. into a film having projections substantially uniformly distributed thereon, cooling the film to 75° C. or less to cause the resin to solidify, and thereafter granulating the resultant solidified resin by bending the film.

3. An apparatus for cooling molten resin comprising a tank containing said resin and a movable foraminous belt arranged to move through said tank thus having a film of resin deposited thereon.

4. An apparatus for cooling molten resin comprising a tank containing said resin and a continuously movable foraminous belt arranged to move into and through said tank to have a film of resin deposited thereon and means for agitating said belt to remove the resin therefrom.

5. An apparatus for cooling and granulating molten resins which comprises a foraminous belt, means for coating said belt with a film of molten resin, means for cooling and solidifying said film on said belt, and means for bending said belt to granulate said solidified film.

6. An apparatus for cooling and granulating molten resins which comprises a foraminous belt, means for coating said belt with a film of molten resin, means for cooling and solidifying said film on said belt, means for bending said belt to granulate said solidified film, and means for vibrating said belt to discharge said granules.

7. An apparatus for cooling and granulating molten resins which comprises an endless travelling foraminous belt, means for depositing a film of molten resin on said belt, means for cooling and solidifying said film on said belt during a portion of the travel thereof, and means for bending said belt carrying said solidified film to granulate the same.

8. An apparatus for cooling and granulating molten resins which comprises an endless travelling foraminous belt, means for depositing a film of molten resin on said belt, means for cooling said film on said belt during a portion of the travel thereof, means for bending said belt carrying said solidified film to granulate the same, and means for vibrating said belt to discharge said granules.

9. An apparatus for cooling molten resin comprising a movable foraminous belt supported and arranged to move in two planes, means positioned in one of said planes for depositing molten resin on said belt, said belt during its movement subjecting said film to a cooling medium, and means for removing said resin from said belt while it is moving in said other plane.

10. An apparatus for cooling molten resin comprising a foraminous belt having vertical and horizontal runs, means for supplying molten resin to said vertical run and means for agitating said horizontal run to remove the resin therefrom.

STUART P. MILLER.